United States Patent
Park et al.

(10) Patent No.: US 8,947,578 B2
(45) Date of Patent: Feb. 3, 2015

(54) APPARATUS AND METHOD OF CAPTURING IMAGE

(75) Inventors: Byung-kwan Park, Seoul (KR); Hyun-wook Ok, Seoul (KR); Joo-young Kang, Yongin-si (KR); Jae-guyn Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 637 days.

(21) Appl. No.: 12/564,065

(22) Filed: Sep. 22, 2009

(65) Prior Publication Data

US 2010/0085468 A1    Apr. 8, 2010

(30) Foreign Application Priority Data

Oct. 6, 2008 (KR) .................. 10-2008-0097841

(51) Int. Cl.
   *H04N 5/225* (2006.01)
   *H04N 5/232* (2006.01)

(52) U.S. Cl.
   CPC ....... *H04N 5/23212* (2013.01); *H04N 5/23296* (2013.01)
   USPC ......................................... 348/340

(58) Field of Classification Search
   None
   See application file for complete search history.

(56) References Cited

U.S. PATENT DOCUMENTS

| | | | |
|---|---|---|---|
| 6,954,310 B2 | 10/2005 | Holloway et al. | |
| 7,176,975 B2 * | 2/2007 | Matsunaga et al. | 348/345 |
| 7,417,674 B2 * | 8/2008 | Gruhlke | 348/240.3 |
| 8,055,097 B2 * | 11/2011 | Inoue et al. | 382/284 |
| 8,305,429 B2 | 11/2012 | Kajihara et al. | |
| 2004/0032525 A1 * | 2/2004 | Aharon | 348/350 |
| 2006/0056078 A1 * | 3/2006 | Nomura et al. | 359/811 |
| 2006/0221209 A1 | 10/2006 | McGuire et al. | |
| 2007/0188769 A1 | 8/2007 | Rohaly et al. | |
| 2007/0230944 A1 | 10/2007 | Georgiev | |
| 2008/0152215 A1 | 6/2008 | Horie et al. | |
| 2009/0102956 A1 * | 4/2009 | Georgiev | 348/315 |
| 2009/0140131 A1 * | 6/2009 | Utagawa | 250/226 |

FOREIGN PATENT DOCUMENTS

| | | |
|---|---|---|
| JP | 08-062495 | 3/1996 |
| JP | 2002-94765 | * 3/2002 |
| JP | 2006-287948 A | 10/2006 |
| JP | 2007-025158 | 2/2007 |

(Continued)

OTHER PUBLICATIONS

Edward H. Adelson, et al., "Single Lens Stereo with a Plenoptic Camera," IEEE Transaction on Pattern Analysis and Machine Intelligence, vol. 14, Feb. 2, 1992, pp. 99-106.

(Continued)

*Primary Examiner* — Albert Cutler
(74) *Attorney, Agent, or Firm* — NSIP Law (57) ABSTRACT

An apparatus for capturing an image of a scene including an image capturing unit and a data processing unit. The image capturing unit may generate light field data and may include a first optical having at least two portions with at least two different fields of view, a sensing unit having a plurality of photosensors, and a second optical unit interposed between the first optical unit and the sensing unit. The data processing unit may perform at least one of change of view of the image and refocusing the generated light field data. The sensing unit may be configured to obtain an image with at least two magnifications corresponding to regions of the scene.

19 Claims, 8 Drawing Sheets

(56) References Cited

FOREIGN PATENT DOCUMENTS

| | | |
|---|---|---|
| JP | 2008-167395 A | 7/2008 |
| KR | 1020070057418 | 6/2007 |
| KR | 1020070057998 | 6/2007 |
| WO | WO 00/41010 | 7/2000 |

OTHER PUBLICATIONS

Ren Ng., et al., "Ligh Field Photography with a Hand-held Plenoptic Camera," Stanford Tech Report, CTSR, Feb. 2005, pp. 1-11.

* cited by examiner

FIG.8

# APPARATUS AND METHOD OF CAPTURING IMAGE

CROSS REFERENCE TO RELATED APPLICATIONS

This application claims the benefit under 35 U.S.C. §119(a) of a Korean Patent Application No. 10-2008-97841, filed on Oct. 6, 2008 in the Korean Intellectual Property Office, the entire disclosure of which is incorporated herein by reference.

BACKGROUND

1. Field

The following description relates to an image capturing application. More particularly, this description relates to an image capturing apparatus and method to focus and adjust image data.

2. Description of the Related Art

Currently, image capturing systems that are widely used produce a single viewable image. Recently, research has been conducted on a plenoptic camera producing refocused images at the time of image capture. The plenoptic camera, which is often called a light field camera, capturing 4-dimensional light field information of an image using a microlens array (generally, a lenticular lens array) or a light coded mask. Hence, the plenoptic camera may provide a user with various functions such as refocusing of an image after being photographed and view variation by which an image is viewed as if a scene captured by a camera is shown from various points of view.

SUMMARY

In one general aspect, an apparatus for capturing an image of a scene includes an image capturing unit and a data processing unit. The image capturing unit may generate light field data and may include a first optical having at least two portions with at least two different fields of view, a sensing unit having a plurality of photosensors, and a second optical unit interposed between the first optical unit and the sensing unit. The data processing unit may perform at least one of change of view of the image and refocusing the generated light field data. The sensing unit may be configured to obtain an image with at least two magnifications corresponding to regions of the scene.

The sensing unit may be configured to obtain the image having at least two portions of at least two different magnifications corresponding to the at least two different fields of view and the data processing unit performs at least one of image processing operation including change of a view, refocusing, and adjustment of a field of view of the image obtained by the sensing unit.

The first optical unit may further include a plurality of lenses of at least two different fields of view and the second optical unit is positioned at a focal length of each lens.

The first optical unit may have three lenses aligned on an axis and a lens positioned at the center of the axis has a longer focal length than a focal length of the other lenses.

The first optical unit may further include a pinhole array having at least two pinholes and the second optical unit is located positioned at a focal length of each pinhole.

The first optical unit may have a pinhole array having three pinholes aligned on an axis and a pinhole at the center of the axis has a longer focal length than a focal length of the other two pinholes.

The second optical unit may include one of a microlens array and an optical encoding mask.

The data processing unit may generate an image of a single magnification from the image having at least two portions each with at least a different magnification.

The data processing unit may sub-sample a portion of a higher magnification in the obtained image to generate an image at a low magnification.

The data processing unit may select a portion of a higher magnification from the obtained image and may generate an enlarged image from the selected portion of the image with a higher resolution than the resolution of the remainder of the obtained image.

In another aspect, a method of capturing an image of a scene by an image capturing apparatus includes obtaining by sensing unit of the image capturing apparatus an image having portions of at least two different magnifications; generating by the image capturing apparatus light field data for changing of view of the image and refocusing; and performing by a data processing unit of the image capturing apparatus at least one of image processing operations including change of a view, refocusing, and adjustment of a field of view of the image using the obtained image and light field data.

Performing the image processing operations may include generating an image at a single magnification from the obtained image with at least two different magnifications.

Performing the image processing operations may include subsampling a portion of a higher magnification in the obtained image to generate an image at a low magnification.

Performing the image processing operations may include selecting from the obtained image a portion of a higher magnification and using the selected portion of the image to generate an enlarged image with a higher resolution than the resolution of the remainder of the obtained image.

Other features and aspects will be apparent from the following description, drawings, and claims.

BRIEF DESCRIPTION OF THE DRAWINGS

Throughout the drawings and the detailed description, unless otherwise described, the same drawing reference numerals refer to the same elements, features, and structures.

The relative size and depiction of these elements may be exaggerated for clarity, illustration, and convenience.

DETAILED DESCRIPTION

The following detailed description is provided to assist the reader in gaining a comprehensive understanding of the media, methods, apparatuses and systems described herein. Accordingly, various changes, modifications, and equivalents of the media, methods, and systems described herein will be suggested to those of ordinary skill in the art. Also, description of well-known functions and constructions may be omitted for increased clarity and conciseness.

Figure 1:
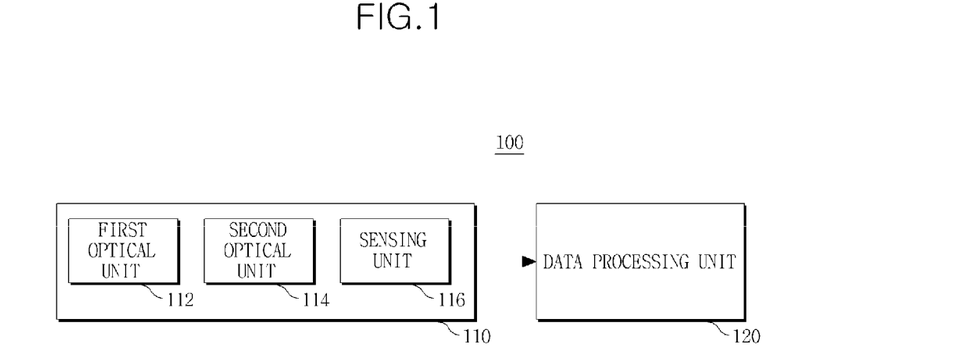
FIG. 1 is a block diagram illustrating an exemplary image capturing apparatus.

FIG. 1 illustrates an exemplary image capturing apparatus 100. The image capturing apparatus 100 includes an image capturing unit 110 and a data processing unit 120 to process captured image data. The image capturing unit 110 may include a first optical unit 112, a second optical unit 114, and a sensing unit 116. The image capturing apparatus 100 may be implemented as various types of image photography apparatuses including, but not limited to, a camera built-in mobile phone, a compact camera, a scientific microscope, a medical imaging apparatus, and an astronomical telescope.

Figure 2:
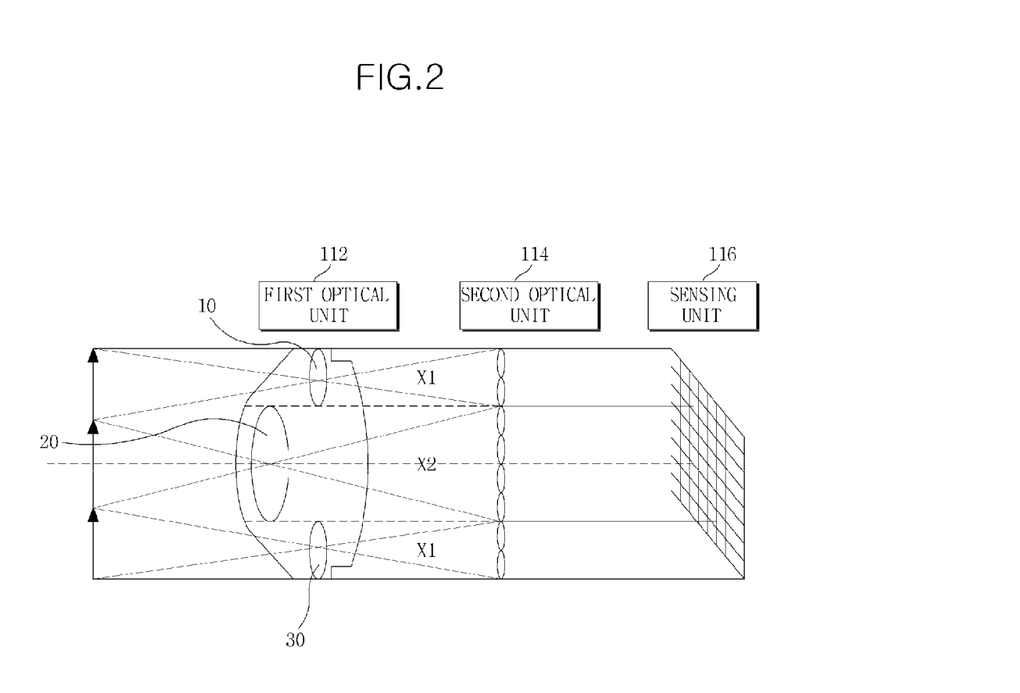
FIG. 2 is a diagram illustrating an exemplary image capturing unit including lenses having at least two different fields of view.
Figure 4:
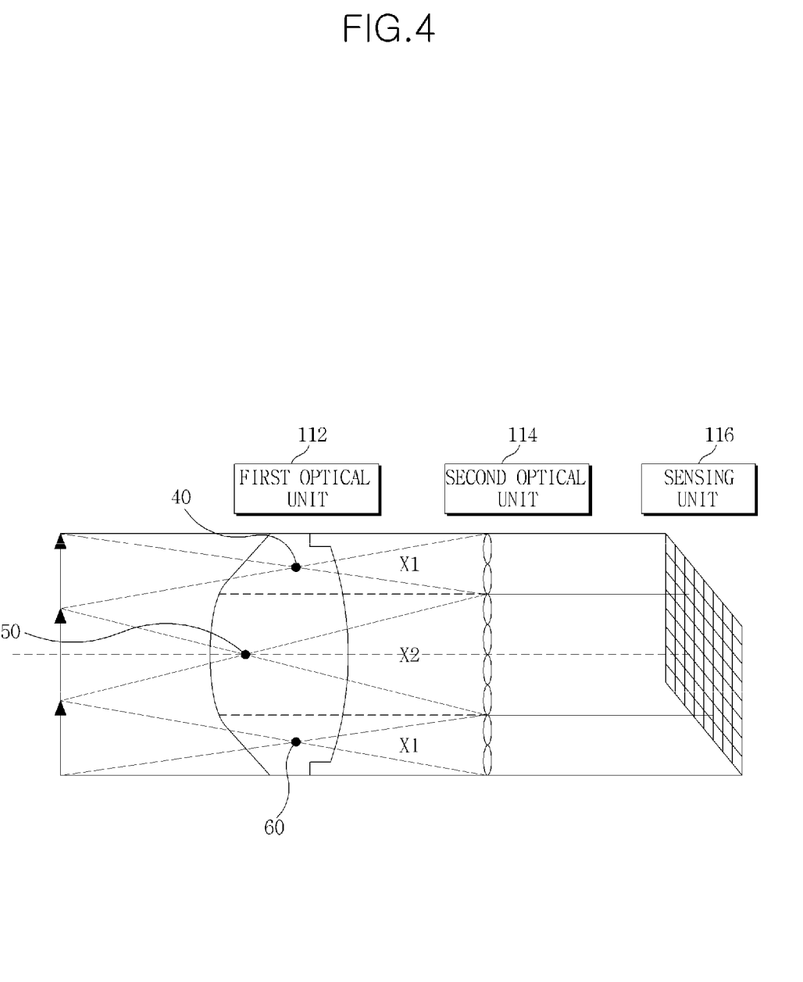
FIG. 4 is a diagram illustrating an exemplary image capturing unit including a pinhole array having at least two pinholes at different locations.

The first optical unit 112 may be an object lens or a main lens and may be configured to include at least two portions having at least two different fields of view. The first optical unit 112 may include a plurality of lenses with different fields of view as shown in FIG. 2, or alternatively, the first optical unit 112 may include a pinhole array for achieving a plurality of focal distances as shown in FIG. 4.

The second optical unit 114 may be interposed between the first optical unit 112 and the sensing unit 116 to obtain optical field data. The second optical unit 114 may classify rays of light passing through the first optical unit 112 according to directions the light rays travel and may generate an image of a photographed scene on the sensing unit 116. To this end, the second optical unit 114 may be formed of a microlens array or a light coded mask to classify the rays of light passing through the first optical unit 112 according to the directions the light rays travel. However, the first optical unit 112 and the second optical unit 114 may be implemented as various types of lenses or microlens arrays which are currently available or are developed in future. In this example, it is assumed that the first optical unit 112 may include a pinhole array and the second optical unit 114 may include a microlens array.

The sensing unit 116 may capture light passing through the image capturing unit 110 and may convert the light into an electric signal. The sensing unit 116 may be configured as a photosensor array having a plurality of photosensors. In this example, it is assumed that the sensing unit 116 includes a photosensor array. Upon generating an image of the scene by the second optical unit (e.g., the microlens array) 114 on the sensing unit 116, the sensing unit 116 may transmit sensed information along with data and location information of each photosensor and provides the sensed information to the data processing unit 120.

In regard to a two-plane light field "L" inside the image capturing apparatus 100, L (i.e., u, v, s, t) denotes light travelling along a ray which passes through a plane (u, v) on the first optical unit 112 (e.g., the pinhole array) and then passes through a plane (s, t) on the microlens array. If the microlens array includes an ideal microlens and the sensing unit 116 (e.g., the photosensor array) includes ideal photosensors (e.g., pixels) in a matrix arrangement, as in this example, every ray proceeding to the photosensor array passes through a square parent microlens in the microlens array and a pair-square of the pinhole array of the first optical unit 112. The two square regions on the first optical unit 112 and the microlens array define a small four-dimensional box in the light field, and the photosensor of the sensing unit 116 measures the total amount of light in a light ray set expressed by the box.

The sensing unit 116 may obtain light field data of an image having portions of at least two different magnifications corresponding to at least two fields of view of the first optical unit 112.

The data processing unit 120 may interpret images obtained by the sensing unit 116 and may reconstruct the images to obtain a desired image effect. The data processing unit 120 may perform at least one of image processing operations including change of a view of an image, refocusing, and adjustment of a field of view, using the image and light field data obtained by the sensing unit 116. The data processing unit 120 may generate a view-changed image or a refocused image by use of a function of light rays detected from different photosensors of the sensing unit 116 and an incident angle of the light detected on two-dimensional focal plane, which is characterized by the location of each photosensor that detects the light.

The data processing unit 120 may zoom into a particular portion of an image obtained by photographing a given scene, or may generate an image of the scene from a particular point of view. That is, the data processing unit 120 may change the view of an image or the focus. Also, the data processing unit 120 may zoom into an image having at least two portions of at least two different magnifications at two or more zooming ratios.

The data processing unit 120 may generate an image at one magnification using an image having at least two portions of at least two different magnifications. For example, if a captured scene includes an image portion of ×1 magnification and an image portion of ×2 magnification, the image of the entire scene may be processed at ×1 magnification. In this case, the resulting image is the same as an image obtained by a conventional camera having an object lens with one field of view. For such a process, the data processing unit 120 may sub-sample an image portion of a higher magnification (e.g., an image portion of ×2 magnification) to generate an image portion of a lower magnification (e.g., an image portion of ×1 magnification). In addition, the data processing unit 120 may select the image portion of a higher magnification (e.g., an image portion of ×2 magnification) to generate a higher-resolution enlarged image, as compared to the rest of the image of the scene.

Although it is illustrated in FIG. 1 that the first optical unit 112 includes object lenses having different fields of view, an image capturing apparatus 100 may be configured to include a plurality of image capturing units 110 to obtain light field data of light that has passed through each object lens having different fields of view. For example, an image capturing apparatus 100 may include an image capturing unit 110 including of an image capturing portion A obtaining light field data of light passing through an object lens having a first field of view, an image capturing portion B obtaining light field data of light passing through an object lens having a second field of view, and an image capturing portion C obtaining light field data of light passing through an object lens having a third field of view.

The image capturing apparatus 100 may further include a display (not shown) or a storing unit (not shown) to display and store a desired image, and a user interface unit (not shown) to receive a user input signal for instructing a data processing operation.

As such, light field data of an image may be obtained to generate an image view adjustment and refocusing. Moreover, data may be obtained from parts of an image at different fields of view or with different zoom factors to provide a function of adjusting a field of view that enables a particular portion of an image to be viewed as if from a different field of view.

FIG. 2 illustrates an exemplary image capturing unit including lenses having at least two different fields of view.

A first optical unit 112 may be formed of a lens array including a plurality of lenses having at least two fields of view. The first optical unit 112 may have a center lens 20 with a narrower field of view (or with a high magnification) disposed at the center and upper and lower positioned lenses 10 and 30 with a comparatively wider field of view (or with a lower magnification) than the center lens 20. As shown in the example of FIG. 2, the first optical unit 112 has three vertically aligned lenses, and a focal length of the center lens 20 is twice as long as that of the upper and lower lenses 10 and 30. However, the focal length of the center lens 20 of the first optical unit 112 need be longer than that of the upper and lower lenses 10 and 30.

To maintain the brightness of the entire image, that is, f number, the ratio of the diameters between the center lens 20 and the upper and lower lenses 10 and 30 may be the same as the ratio of the focal lengths therebetween. An example of the first optical unit 112 is described below with respect to FIG. 3.

Figure 3:
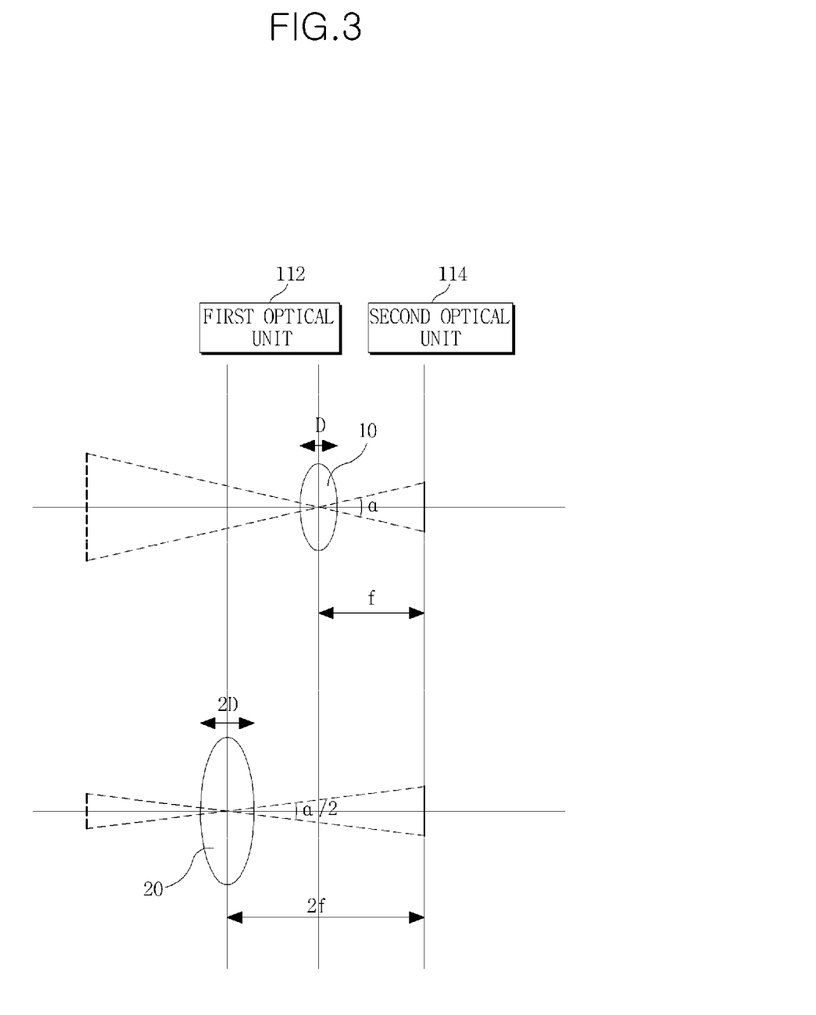
FIG. 3 is another diagram illustrating the exemplary image capturing unit shown in FIG. 2.

FIG. 3 illustrates further detail of the exemplary image capturing unit shown in FIG. 2. The focal lengths of the lenses 10 and 20 are shown in FIG. 3. Although the lens 30 is not illustrated in FIG. 3, the lens 30 may have the same focal length and the diameter as the lens 10.

To achieve an image twice as large as obtained by the lens 10 with the lens 20, the f-number of the center lens 20 may be adjusted such that the diameter and the focal length of the lens 20 are double the diameter and the focal length of the lens 10, and the resulting brightness of an image is maintained. The field of view of the lens 20 is half of that of the lens 10 to produce a twice-enlarged image. As shown in FIG. 3, since the field of view of the center lens 20, which is represented by α/2, is half of the field of view of the lens 10, which is represented by α. That is, a region of a scene captured on a predetermined area of the microlens array by the lens 20 is halved, compared to the lens 10. Therefore, the center portion of the image may have a higher-resolution than the rest of the image (i.e., the top and bottom portions). That is, the center portion of the image may appear as if zoomed in two times compared to the rest portion of the image.

The second optical unit 114 which is placed behind the first optical unit 112 may allow the data processing unit to perform an image process to generate at least one of various view images appearing to be from particular portions and a refocused image. In this case, the second optical unit 114 may be arranged at the focal length of each lens. Although the second optical unit 114 formed of the microlens array is arranged on one focal plane in a line with respect to the first optical unit 112 in FIG. 3, the arrangement of the microlens array of the second optical unit 114 may be adjusted to cause the sensing unit 116 to detect a sharp image.

FIG. 4 illustrates an exemplary image capturing unit including a pinhole array having at least two pinholes at different locations. The structure of the image capturing unit in FIG. 4 is similar to the image capturing unit in FIG. 2, except that a pinhole array is substituted for the lens array of the first optical unit 112 shown in FIG. 2. In FIG. 4, the first optical unit 112 includes a pinhole array having at least two pinholes at different positions to obtain different fields of view at parts of an image. A second optical unit 114 may be arranged to be placed at the focal length of each pinhole.

In this example, three pinholes in the first optical unit 112 are vertically aligned such that they have different focal lengths, and a center pinhole 50 is configured such that its focal length is twice as long as the focal length of upper and lower pinholes 40 and 60. However, other focal lengths may be used; for example, the focal length of the center pinhole 50 only need be longer than the focal length of the upper and lower pinholes 40 and 60.

Figure 5:
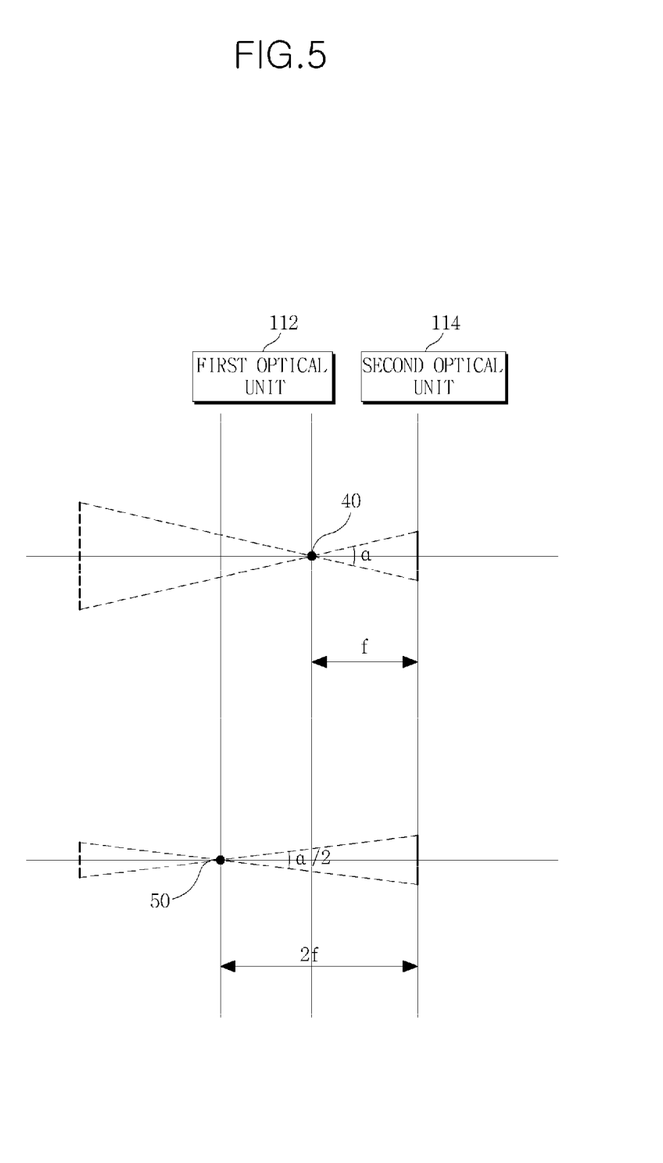
FIG. 5 is another diagram illustrating the exemplary image capturing unit shown in FIG. 4.

FIG. 5 illustrates further detail of the exemplary image capturing unit shown in FIG. 4. The focal lengths of the upper pinhole 40 and the center pinhole 50 are depicted in FIG. 4. The lower pinhole 60 which is not illustrated in FIG. 4 may have the same focal length and diameter as the upper pinhole 40. The center pinhole 50 may be positioned twice farther than the upper pinhole 40 from the second optical unit 114 to obtain an image with a half field of view (i.e., a twice-enlarged image), as compared to the remainder of the image.

As shown in FIG. 5, since the field of view of the center pinhole 50, which is represented by α/2, is half of a field of view of the upper pinhole 40, which is represented by α, a half range of a scene may be captured on a predetermined area of the microlens array of the second optical unit 1134 when using the center pinhole 50, where compared to the case of using the rest of pinholes 40 and 60. Hence, a center part of an image captured through the center pinhole 50 has a higher resolution than the rest part of the image, and the center part of the image may appear as if zoomed in two times compared to the rest part of the image.

Figure 6A:
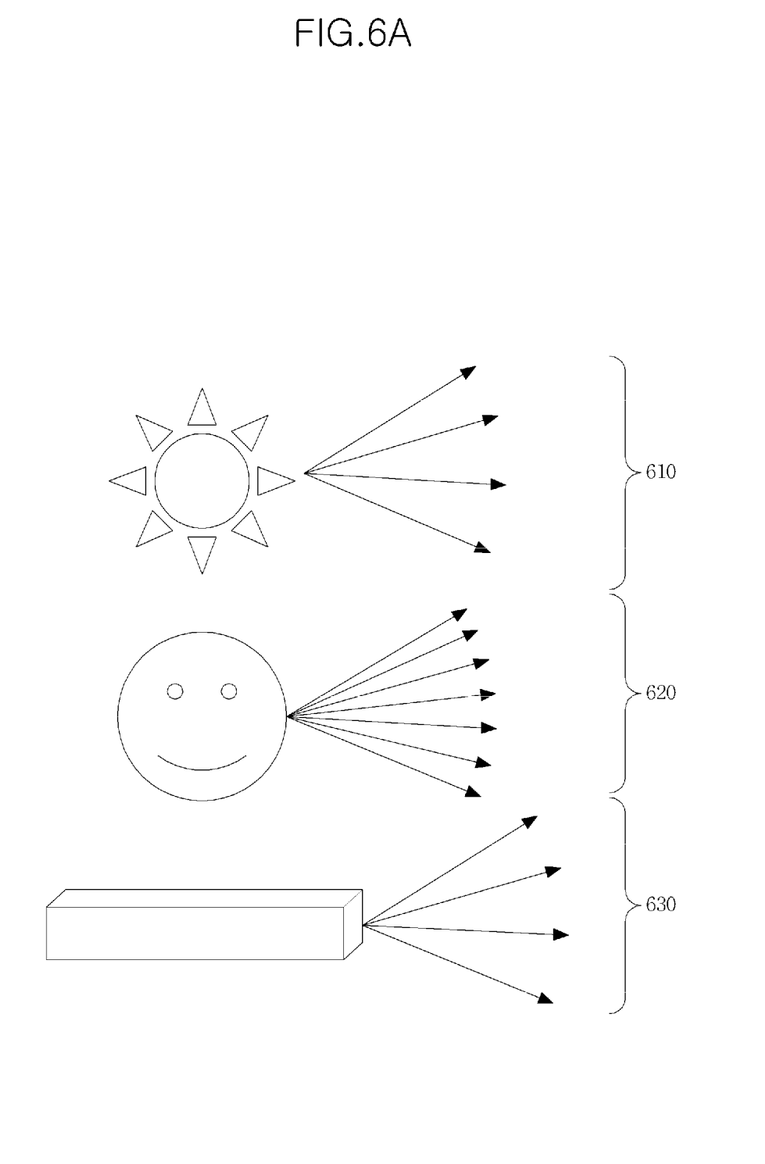
FIG. 6A is a diagram illustrating examples of objects to be captured.
Figure 6B:
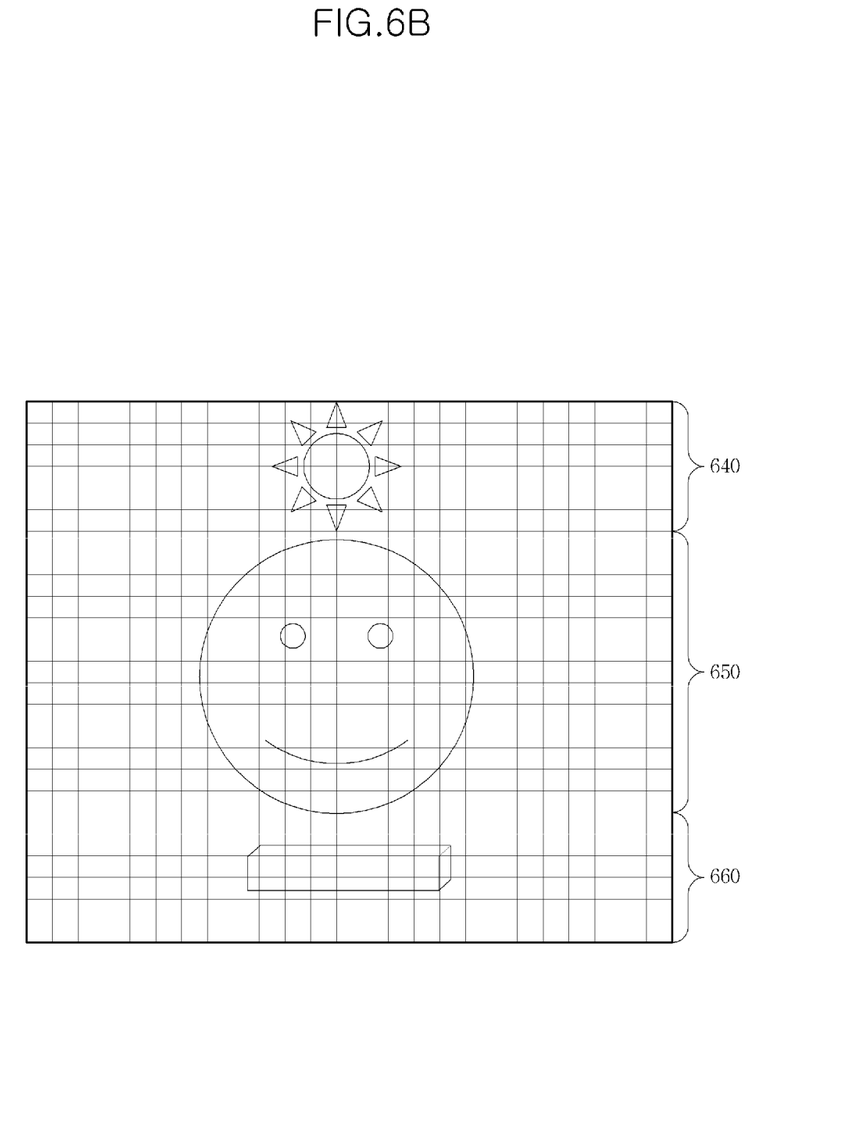
FIG. 6B is a diagram illustrating an obtained exemplary image of a scene including the objects shown in FIG. 6A.

FIG. 6A shows examples of objects 610, 620, and 630 to be captured by the image capturing apparatus and FIG. 6B shows an example of an obtained image of a scene including the objects 610, 620, and 630 shown in FIG. 6A.

When three objects arranged vertically as shown in FIG. 6A are captured by an image capturing apparatus including the image capturing unit as shown in FIGS. 2 to 5, the center of the captured image may appear to be enlarged twice as much as the rest part of the image. In FIG. 6B, an image 650 of the center object 620 may be enlarged twice as much as images 640 and 660 of the other objects 610 and 630. In this case, the sensing unit 116 of the image capturing apparatus may sense light data from the center object 620 twice as much as from the rest objects, so that the image of the center object 620 may appear to be zoomed in twice as much as the other images 640 and 660 at the same resolution.

Figure 7A:
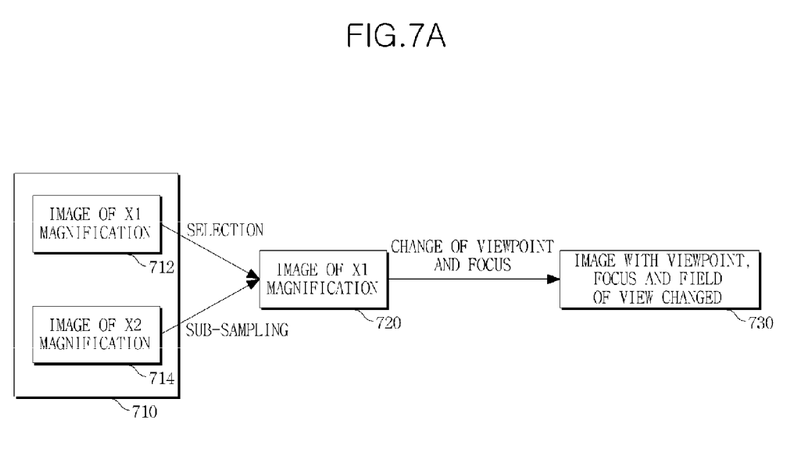
FIG. 7A is a block diagram illustrating an exemplary method of processing data.
Figure 7B:
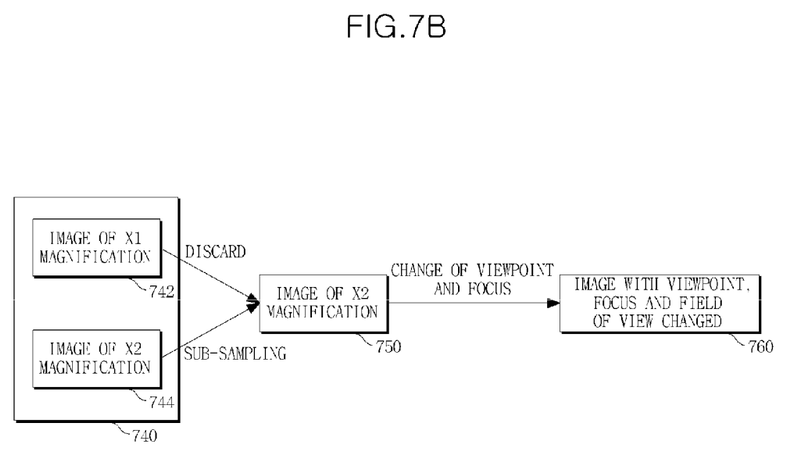
FIG. 7B is another block diagram illustrating an exemplary method of processing data.

FIGS. 7A and 7B illustrate exemplary methods to process data.

In FIG. 7A, an exemplary image capturing unit may obtain an image 710 having at least two portions 712 and 714, one 712 at ×1 magnification and another 714 at ×2 magnification, and may generate the entire image 720 at ×1 magnification. The image capturing unit may achieve the light field data to change a view and refocus the image 710. Sub-sampling may be performed on the image portion 714 at ×2 magnification to decrease the magnification to half, and the sub-sampled image portion 714 may be combined with the image portion at ×1 magnification and the entire image 720 may be generated at ×1 magnification. Moreover, in the entire image 720 generated at ×1 magnification, the point of view and the focus may be changed so that consequently a final image 730 is generated in which the point of view, the focus, or the field of view of the original image 710 are changed.

In FIG. 7B, an exemplary image capturing unit may obtain light field data of an image 740 having at least two portions 742 and 744, one 742 at ×1 magnification and another 744 at ×2 magnification, to alter the point of view and focus of the image 740 and generate the entire image 760 at ×2 magnification. The image portion 742 at ×1 magnification may be discarded, and only the image portion 744 at ×2 magnification may be selected to generate the entire image 750 at ×2 magnification. In addition, in the entire image 750 at ×2 magnification, the point of view and the focus are changed, so that a final image 760 may be generated where the point of view, the focus, or the field of view of the original image 740 are changed.

Figure 8:
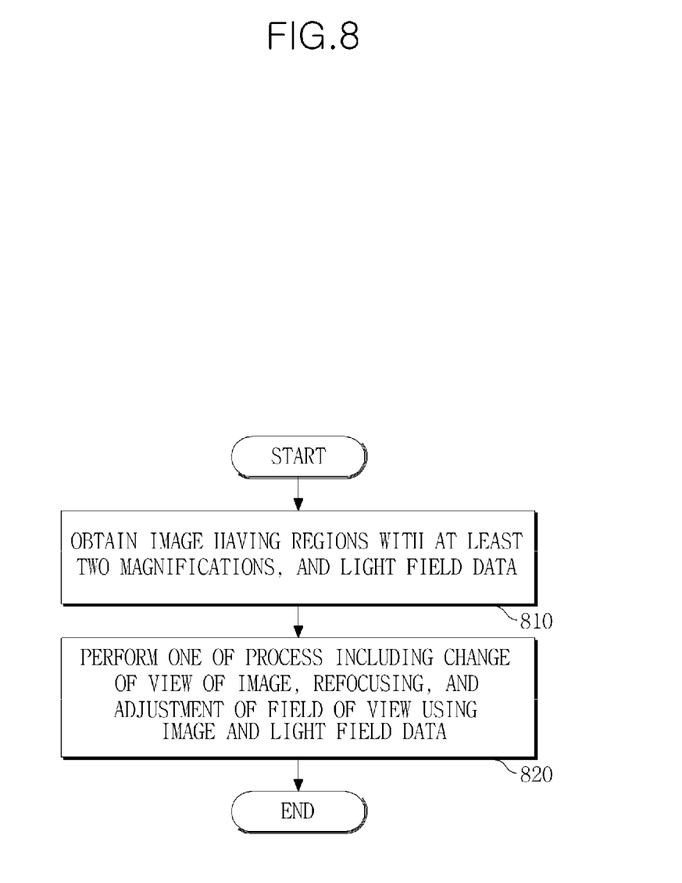
FIG. 8 is a flowchart illustrating an exemplary method of capturing an image of a scene.

FIG. 8 illustrates a flowchart of an exemplary method of capturing a scene.

An image having at least two portions of different magnifications is obtained and light field data of the image is generated for image view changing and refocusing (810).

At least one of the image process procedures including change of image view, refocusing, and adjustment of field of view is performed using the obtained image and light field data (820). An image of a single magnification may be generated from the obtained image having two portions of different magnifications. Alternatively, an image portion of a higher magnification may be sub-sampled to generate a new entire image at a lower magnification. In addition, the image portion of a higher magnification may provide a higher resolution view than an image portion of a lower magnification.

The above-described methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media, such as hard disks, floppy disks, and magnetic tape; optical media such as CD ROM disks and DVD; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices and units may be configured to act as one or more software modules in order to perform the operations and/or methods described above in combination with a processor, computer, and/or computing device.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for capturing an image of a scene, the apparatus comprising:
   an image capturing unit configured to generate light field data, the image capturing unit comprising a first optical unit having two different fields of view, a sensing unit having photosensors, and a second optical unit interposed between the first optical unit and the sensing unit; and
   a data processing unit to perform at least one of change of view of the image and refocusing using the generated light field data,
   wherein the sensing unit is configured to obtain a first portion of the image using a first field of view having a first magnification and obtain a second portion of the image using a second field of view having a second magnification different from the first magnification, the first and second portions corresponding to different portions of the scene, and the data processing unit is configured to generate an entire image of the scene at one magnification using the first portion of the image with the first magnification and the second portion of the image with the second magnification.

2. The apparatus of claim 1, wherein the sensing unit is configured to obtain the image having two different magnifications corresponding to the two different fields of view and the data processing unit performs at least one of image processing operation including change of a view, refocusing, and adjustment of a field of view of the image obtained by the sensing unit.

3. The apparatus of claim 1, wherein the first optical unit further includes a plurality of lenses of two different fields of view and the second optical unit is positioned at a focal length of each lens.

4. The apparatus of claim 3, wherein the first optical unit has three lenses aligned on an axis and a lens positioned at the center of the axis has a longer focal length than a focal length of the other lenses.

5. The apparatus of claim 1, wherein the second optical unit includes one of a microlens array and an optical encoding mask.

6. The apparatus of claim 1, wherein the data processing unit sub-samples a portion of a higher magnification in the obtained image to generate an image at a low magnification.

7. The apparatus of claim 1, wherein the data processing unit selects a portion of a higher magnification from the obtained image and generates an enlarged image from the selected portion of the image with a higher resolution than the resolution of the remainder of the obtained image.

8. The apparatus of claim 1, wherein the first optical unit has two lenses having different diameters aligned on an axis.

9. The apparatus of claim 1, wherein the image capturing unit comprises a first image capturing portion configured to obtain light that passes through an object lens having a first field of view, and a second image capturing portion configured to obtain light that passes through an object lens having a second field of view.

10. A method of capturing an image of a scene by an image capturing apparatus, the method comprising:
   obtaining a first portion of the image using a first field of view having a first magnification and obtaining a second portion of the image using a second field of view having a second magnification that is different from the first magnification, wherein the first and second portions correspond to different portions of the scene and are simultaneously captured; and
   performing at least one of a change of a field of view, refocusing, and adjustment of the field of view of the image using the first portion of the image with the first magnification and the second portion of the image with the second magnification, to generate an entire image of the scene comprising one magnification,
   wherein the performing comprises refocusing the obtained image comprising portions with the two magnifications to generate the image comprising magnification.

11. The method of claim 10, wherein the performing comprises subsampling a portion of a higher magnification in the obtained image to generate an image at a low magnification.

12. The method of claim 10, wherein the performing comprises selecting from the obtained image a portion of a higher magnification and using the selected portion of the image to generate an enlarged image with a higher resolution than the resolution of the remainder of the obtained image.

13. An image processing apparatus, comprising:
   a capturing unit configured to capture a first portion of an image using a first field of view having a first magnification and capture a second portion of the image using a second field of view having a second magnification, the first and second portions being captured simultaneously and corresponding to different portions of a scene; and
   data processing unit configured to generate an entire image of the scene comprising one magnification using the first portion of the image with the first magnification and the second portion of the image with the second magnification,
   wherein the data processing unit is further configured to refocus the captured image comprising portions with the two magnifications to generate the image comprising one magnification.

14. The image processing apparatus of claim 13, wherein the data processing unit is further configured to change a field of view of the captured image comprising portions with the two magnifications to generate the image comprising one magnification.

15. The image processing apparatus of claim 13, wherein the captured image comprises a first image portion comprising a lower magnification and a second image portion comprising a higher magnification, and
   the data processing unit is further configured to sub-sample the second image portion comprising the higher magnification to generate an image at the lower magnification.

16. The image processing apparatus of claim 13, wherein the capturing unit comprises:
   a first optical unit comprising at least two fields of view which are configured to allow the image with at least two magnifications to pass through;
   a second optical unit to generate an image of a photographed scene based on the image with the at least two magnifications that passes through the first optical unit; and
   a sensing unit configured to capture the photographed scene.

17. The image processing apparatus of claim 13, wherein the image capturing unit comprises a first optical unit that includes a center lens comprising a field of view, and two outer lenses disposed on respective sides of the center lens and each comprising a field of view that is greater than the field of view of the center lens.

18. The image processing apparatus of claim 13, wherein the capturing unit comprises a first optical unit that includes a first lens comprising a diameter, and a second lens disposed on a side of the first lens and comprising a diameter that is greater than that of the diameter of the first lens.

19. The image processing apparatus of claim 13, wherein the capturing unit comprises a first image capturing portion configured to obtain light that passes through an object lens having a first field of view, and a second image capturing portion configured to obtain light that passes through an object lens having a second field of view.

* * * * *